Aug. 21, 1951           R. C. DEMLER           2,565,207

DEVICE FOR HANDLING RIGID SHEETS

Filed Nov. 6, 1947           7 Sheets-Sheet 1

Inventor
*Ray C. Demler*
By *Cushman, Darby & Cushman*
Attorneys

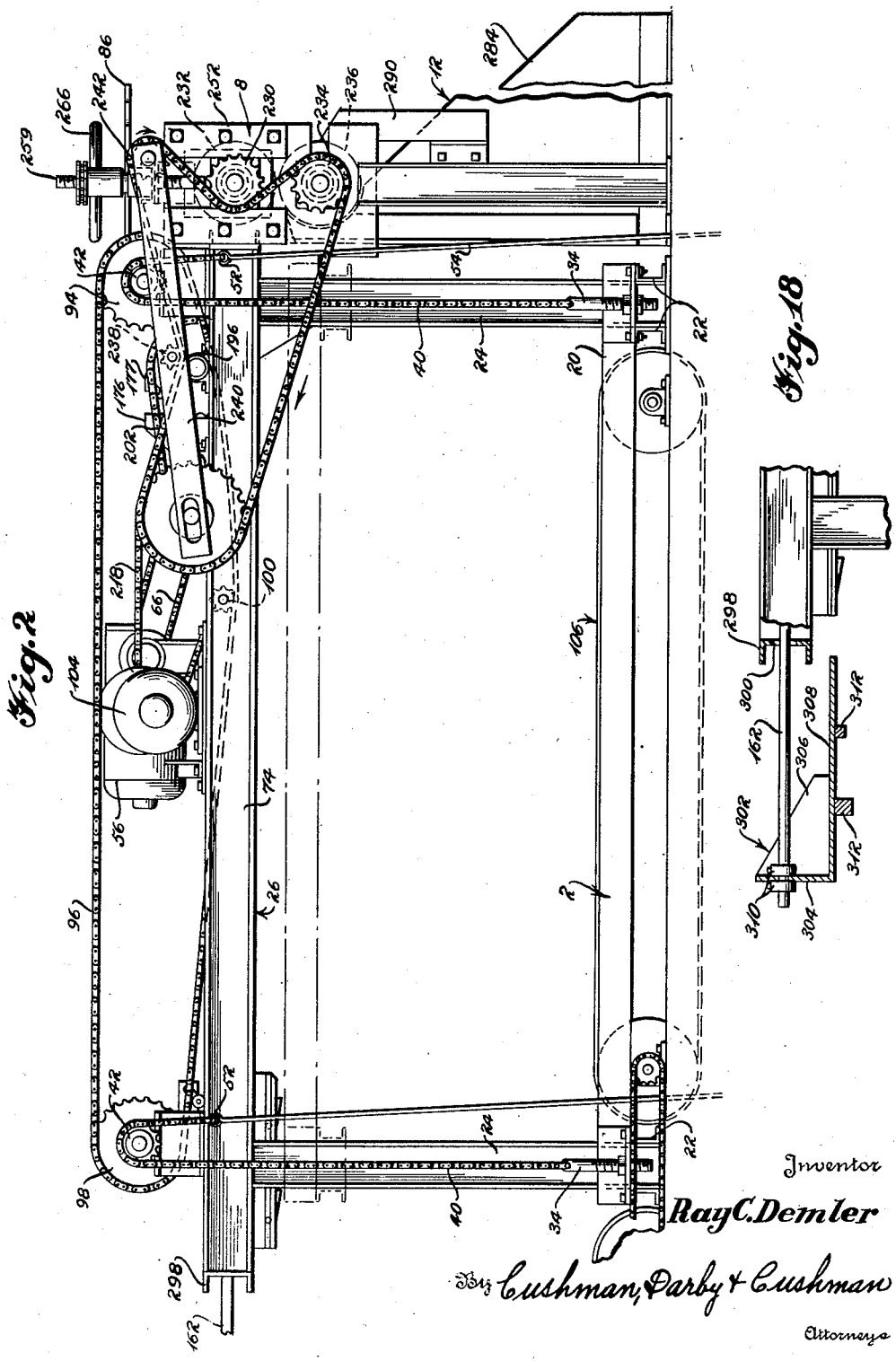

Aug. 21, 1951          R. C. DEMLER          2,565,207
DEVICE FOR HANDLING RIGID SHEETS
Filed Nov. 6, 1947                    7 Sheets-Sheet 3
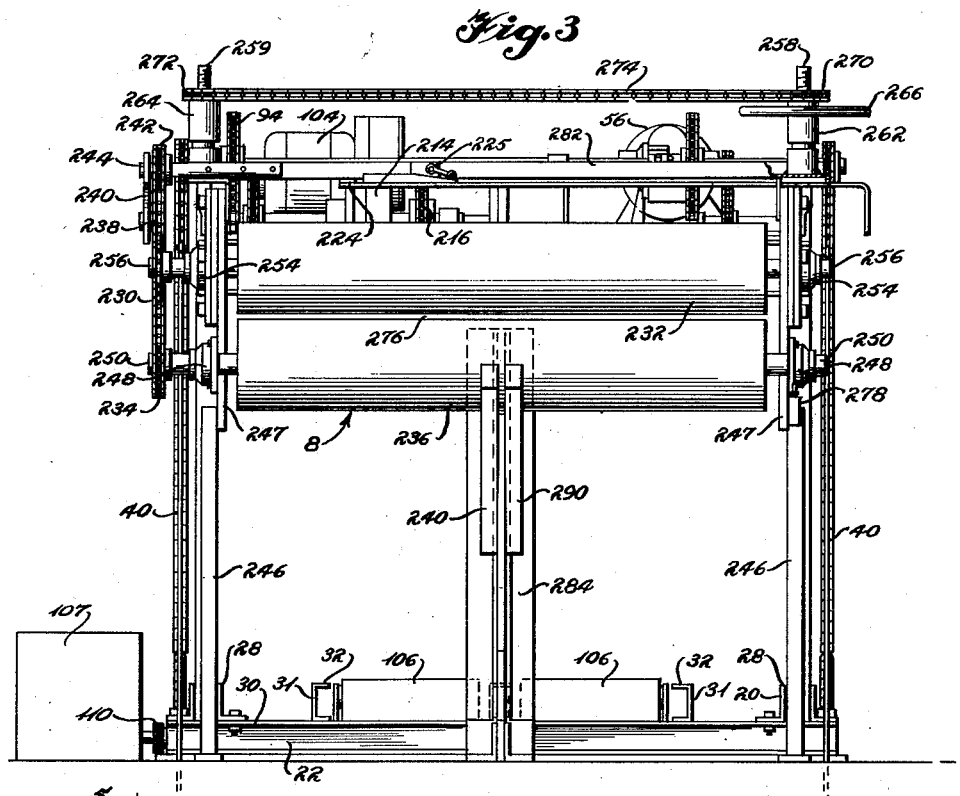
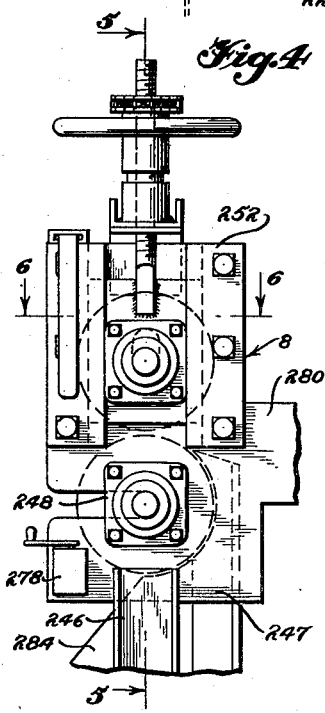
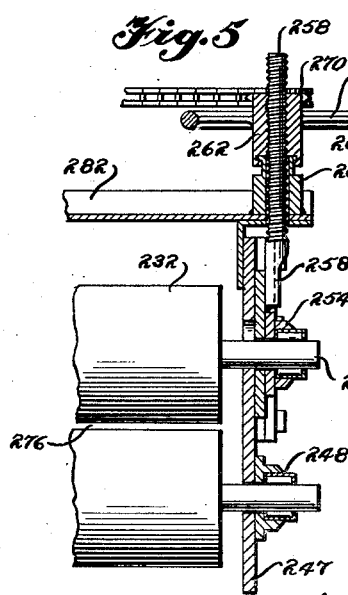
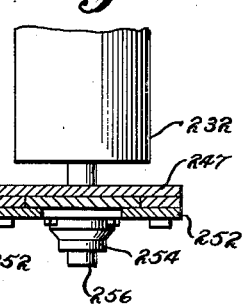
Inventor
Ray C. Demler
By Cushman, Darby & Cushman
Attorneys Aug. 21, 1951　　　　　　　R. C. DEMLER　　　　　　2,565,207
DEVICE FOR HANDLING RIGID SHEETS
Filed Nov. 6, 1947　　　　　　　　　　　　　　　　7 Sheets-Sheet 4
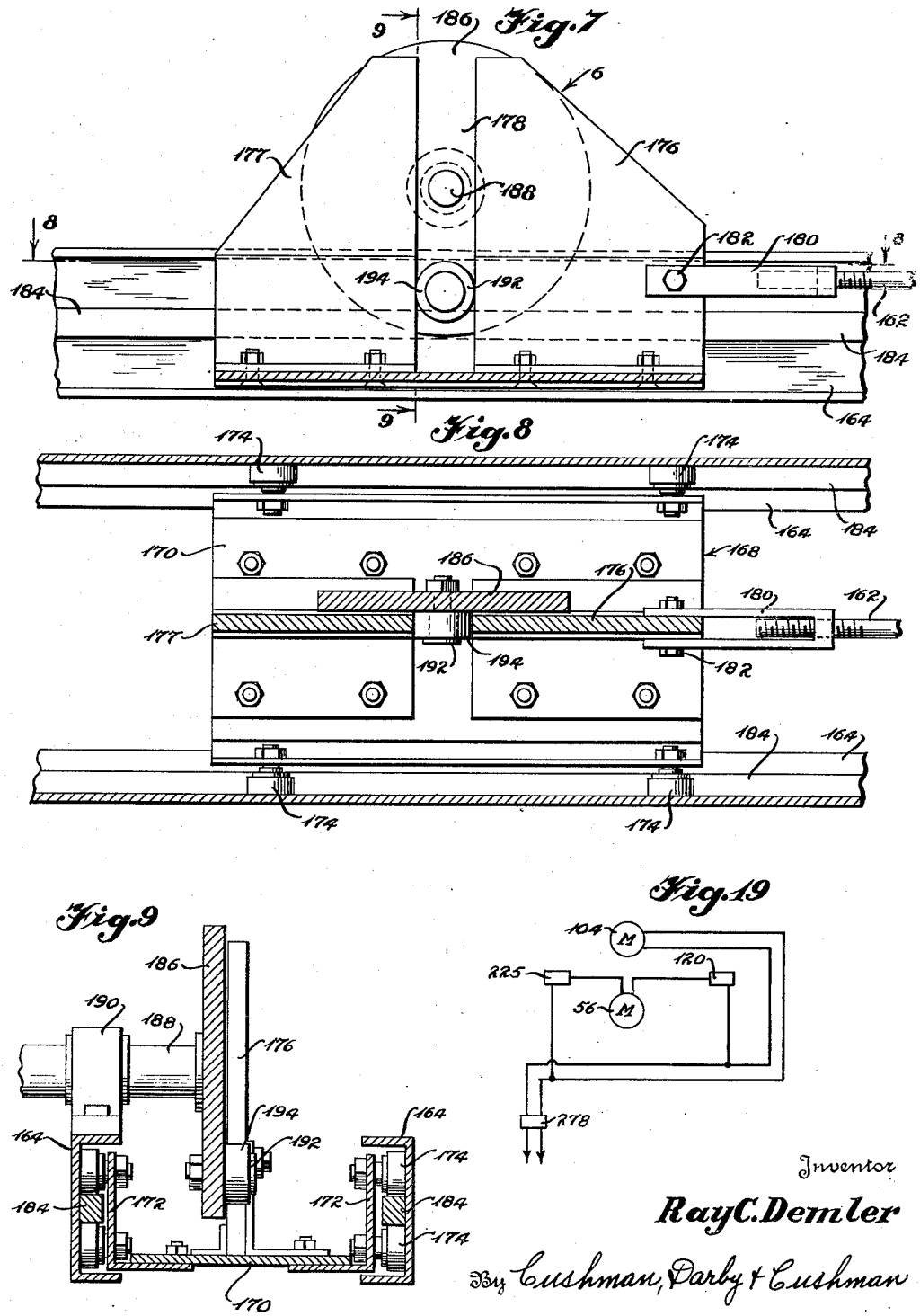
Inventor
Ray C. Demler
By Cushman, Darby & Cushman
Attorneys Aug. 21, 1951  R. C. DEMLER  2,565,207
DEVICE FOR HANDLING RIGID SHEETS
Filed Nov. 6, 1947  7 Sheets-Sheet 5

Inventor
Ray C. Demler
By Cushman, Darby & Cushman
Attorneys

Aug. 21, 1951  R. C. DEMLER  2,565,207
DEVICE FOR HANDLING RIGID SHEETS
Filed Nov. 6, 1947  7 Sheets-Sheet 6
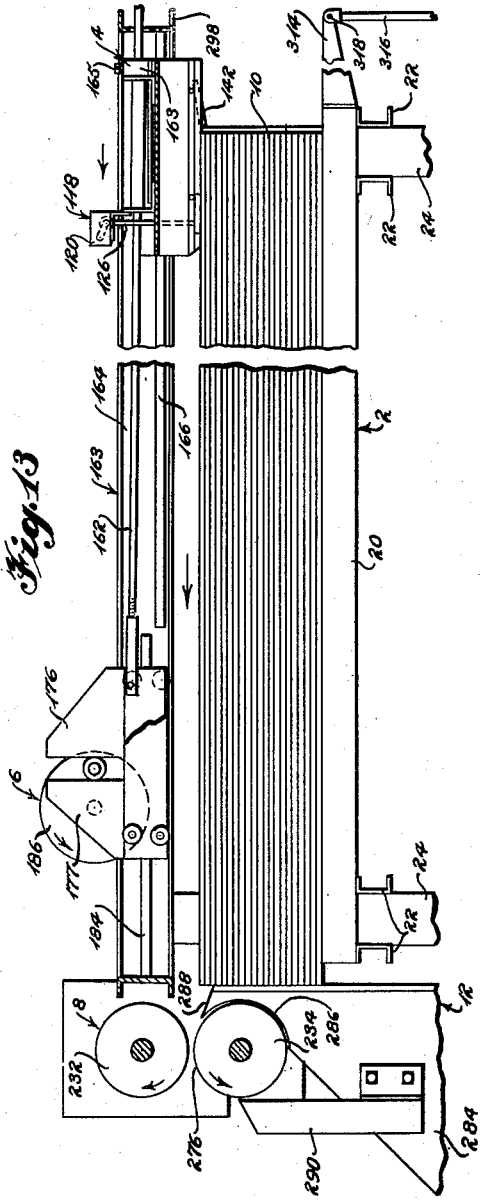
Inventor
*Ray C. Demler*
By *Cushman, Darby & Cushman*
Attorneys

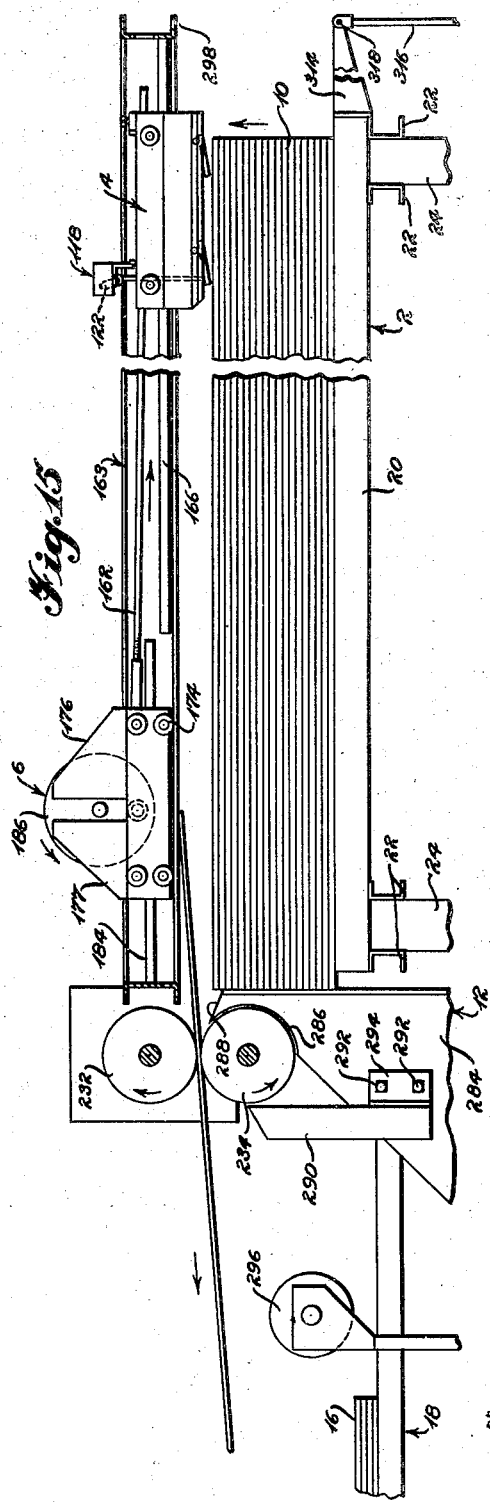

Patented Aug. 21, 1951

2,565,207

UNITED STATES PATENT OFFICE 2,565,207

DEVICE FOR HANDLING RIGID SHEETS

Ray C. Demler, Tacoma, Wash., assignor to International Packaging Corporation, Tacoma, Wash., a corporation of Washington Application November 6, 1947, Serial No. 784,481

6 Claims. (Cl. 214—8.5)

This invention relates to rigid sheet handling devices. More particularly, it is concerned with machines which are capable of transferring a given number of rigid sheets, such as plywood panels, from a large stack of the sheets to an assembly station where the small group of transferred sheets are gathered for passage on to further operations, such as wrapping, packaging or the like.

A principal object of this invention is the provision of a new apparatus for assembling a determinable number of rigid sheets in a stack from a separate stack of a large number of the sheets and the provision of apparatus for use with this method. Further objects include:

(1) The provision of a plywood handling and transferring device adapted for assembling a given number of plywood panels for wrapping, such as by the method shown and described in United States Patent No. 2,215,545;

(2) The provision of apparatus for transferring any specified quantity of plywood panels from a large stack of panels to an assembly station without requiring the use of manual labor;

(3) The provision of apparatus of the subject type which is capable of accomplishing the required transfer of sheets without scarring or otherwise defacing the sheets;

(4) The provision of an automatic device for handling and transferring plywood sheets from one stack to another stack of smaller size;

(5) The provision of a machine which will receive a stack of plywood panels and transfer a given number of panels from the stack to a wrapping assembly station without injury to the panels and without requiring the use of manual work for the transfer operation;

(6) The provision of a new device for transferring a given number of plywood panels from a large stack to a smaller stack assembled for delivery to a wrapping machine.

Still further objects and a complete understanding of the apparatus of the present invention will become apparent from the detailed description given hereinafter in conjunction with the accompanying drawings, in which:

Figure 2 is a side elevation of the device shown in Figure 1.

Figure 3 is a front end elevation of the device shown in Figure 1.

Figure 4 is a detailed side view of the pinch roll section of the device shown in Figure 1.

Figure 5 is a detailed sectional view taken along the line 5—5 of Figure 4.

Figure 6 is a detailed sectional view taken along the line 6—6 of Figure 4.

Figure 7 is an enlarged side view, partly in section, of the cam unit of the device shown in Figure 1.

Figure 8 is a sectional top view taken along the line 8—8 of Figure 7.

Figure 9 is a front end sectional view taken along the line 9—9 of Figure 7.

Figure 13 is a schematic sectional view showing the machine at the beginning of a cycle of operation.

Figure 14 is a schematic side sectional view of the machine as it appears at the completion of one-half the cycle of operation.

Figure 15 is a side sectional view of the machine as it appears at the completion of three-quarters of the cycle of operation.

Figure 16 is a detailed side view showing the elevator hoisting means and corner construction of the elevator of the device shown in Figure 1.

Figure 17 is a top sectional view taken along the line 17—17 of Figure 16.

Figure 18 is a sectional side view of an additional pusher unit of the device shown in Figure 1.

Figure 19 is a wiring diagram showing the arrangement of switches and motors of the device shown in Figure 1.

Figure 1:
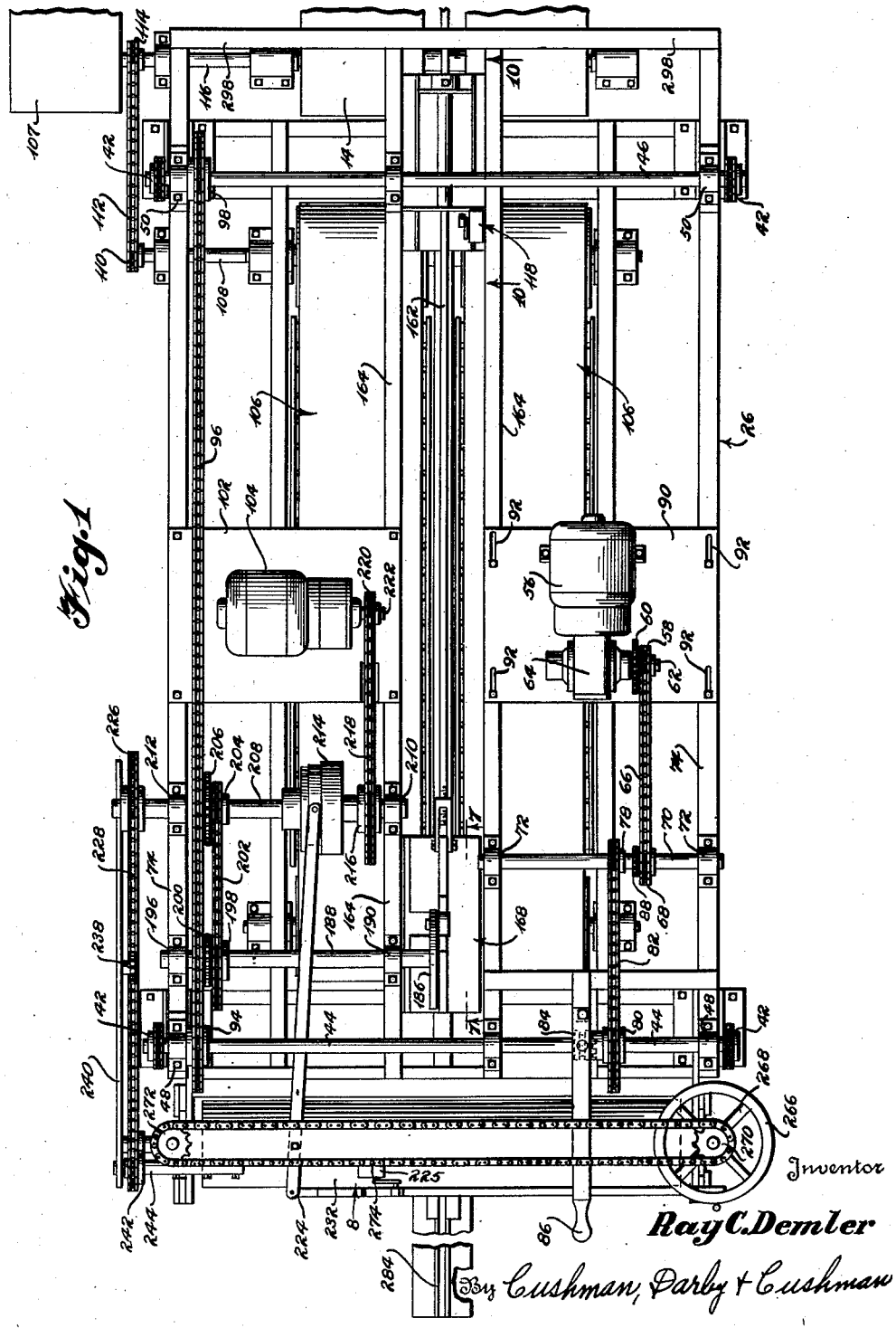
Figure 1 is a top plan view of my complete sheet handling device.

The basic portions of my apparatus and the general mode of operation can be comprehended by reference to Figures 13, 14 and 15. Thus, the sheet handling device basically consists of an elevator 2, a reciprocating pusher assembly 4, an eccentric 6 for reciprocating the pusher 4 and pinch rolls 8 placed with relation to the pusher so as to receive the sheets pushed from the stack 10 by the pusher 4.

The transfer of sheets by my machine is accomplished by a repeated, cyclic operation. A large stack of rigid sheets, such as plywood panels, is placed upon the elevator 2 with the front edge of all of the sheets in the stack abutting a stop member 12 located at the front end of the elevator. Placement of the stack is accomplished by means of a roller conveyor 14 (shown in Figure 1) or other suitable conveying devices. With the stack so positioned upon the elevator, the elevator is hoisted until the top sheet contacts the bottom surface of the pusher 4 when the rise of the elevator is discontinued, in a manner to be described hereinafter. At this point, the pusher 4, which is continuously reciprocated above the stack 10 by means of the cam unit 6, contacts the back edge of the top sheet of the stack, as shown in Figure 13, and pushes the sheet until it is inserted into the nip of rolls 8, as shown in Figure 14. The rolls 8 are driven at a constant speed so that when the sheet is inserted between them it is pulled along from off the top of the stack, as shown in Figure 15, until the rear end of the sheet emerges from the nip of the roll and it falls into position in the stack 16 contained in the assembly station 18. In the meantime, the cam unit 6 causes the pusher 4 to be returned to the back end of the sheet stack while the operation of the elevator is again commenced in order to raise the top sheet of the stack into position against the bottom of the pusher, thus placing the apparatus again at the beginning of an operation cycle as shown in Figure 13. The cycle of pushing and pulling the sheet followed by the elevation of the remainder of the stack, as described above, is continued until the desired number of sheets have been transferred to the assembly station at which time the assembled stack 16 is withdrawn from the station 18 and the transfer of sheets from the stack 10 continues in order to form a new stack at the assembly station.

The details of my device will now be described with reference to the remainder of the drawings. The platform 2 consists of a rectangular frame consisting of angle bars 20 and front and rear members 22. As can be seen in Figure 17, the side members 20 and front and rear members 22 each consist of a pair of rigid channel members, the side members 20 being bolted to the top of the front or rear members 22 in such fashion that a rectangular opening is formed between them which embraces the vertical risers 24 of the frame 26 of the machine. Each corner of the elevator frame has a similar rectangular opening surrounding a vertical riser so that the elevator is free to reciprocate upon the risers.

Since the upper edge 28 of each of the side members 20 is above the level of the top edge 30 of the members 22, channel bars 32 are fastened centrally and lengthwise of the elevator frame upon the end members 22 in order to give more support to the center portions of the sheets placed upon the platform.

The elevator is moved by a sprocket and chain hoist. Thus, at each corner of the elevator, a bolt 34 is fastened at an adjustable height within a hole 36 in the corner of the platform 2 by means of lock nuts 38. One end of a chain 40 is pivoted at the top end of each of the bolts 34. The chains 40 pass over sprockets 42 which are carried upon shafts 44 and 46 held by bearings 48 and 50 upon the top edge of the frame 26. The other ends of the chains 52 are connected to rods 54 which pass through holes in the floor upon which the machine rests, the rods 54 being in turn attached at their opposite ends to counterweights (not shown).

The electric motor 56 is responsible for the movement of the chains 40 to raise and lower the elevator 2. Thus, sprockets 58 and 60 are fixed upon the shaft 62 which extends from the gear box 64 driven by the motor 56. A chain 66 connects the sprocket 58 with the sprocket 68 which is fastened upon the shaft 70. The shaft 70, which is carried in bearings 72 fastened to the top members 74 and 76 of the frame 26, drives the sprocket 78 which rotates the sprocket 80 through the chain 82. The sprocket 80, which includes a toothed clutch face, is free upon the shaft 44 and cooperates with toothed clutch element 84 which is keyed to the shaft 44.

As can be seen, when the motor 56 is operated, the sprocket 80 is caused to rotate through the chains 66 and 82 and with the clutch element 84 engaged with the sprocket 80, the shaft 44 is caused to rotate.

The shaft 70 also carries an additional sprocket 86 which may be employed in cooperation with sprocket 60 in order to cause more rapid rotation of the shaft 44 where it is desirable to hoist the elevator 2 more rapidly than can be done using sprockets 58 and 68. The motor assembly is carried upon a plate 90 which is bolted to the frame through slots 92, which permit the position of the shaft 62 to be adjusted relative to the shaft 70 for tightening or changing the chain 66.

A sprocket 94 is fastened upon the shaft 44 at the end opposite to the drive sprocket 80. A chain 96 connects the sprocket 94 to sprocket 98 fastened upon the shaft 46. Idler 100 draws the bottom portion of the chain 96 down away from the plate 102 upon which the other motor 104 of the unit is fastened.

As will be apparent, rotation of the shaft 44 causes the sprockets 42 at each end of the corners of the frame to rotate raising or lowering the elevator 2 depending upon the direction of rotation of the shaft 44.

Belt conveyors 106 (see Figure 1) are positioned with their top side located approximately on a level with the top edges 28 and 32 of the frame members 20 and 31. The roller conveyors 106 are driven by motor 107 through the shaft 108 by means of sprocket 110 which is connected by chain 112 to the sprocket 114 fastened upon the shaft 116 of the belt conveyor 14. Thus, the stack of sheets which is conveyed from the end of the conveyor 14 will be picked up and moved by the conveyor 106 at the same rate of speed at which the stack is transferred from the conveyor 14. The forward limit of movement of the stack 10 is determined by the stop member 12.

Figure 10:
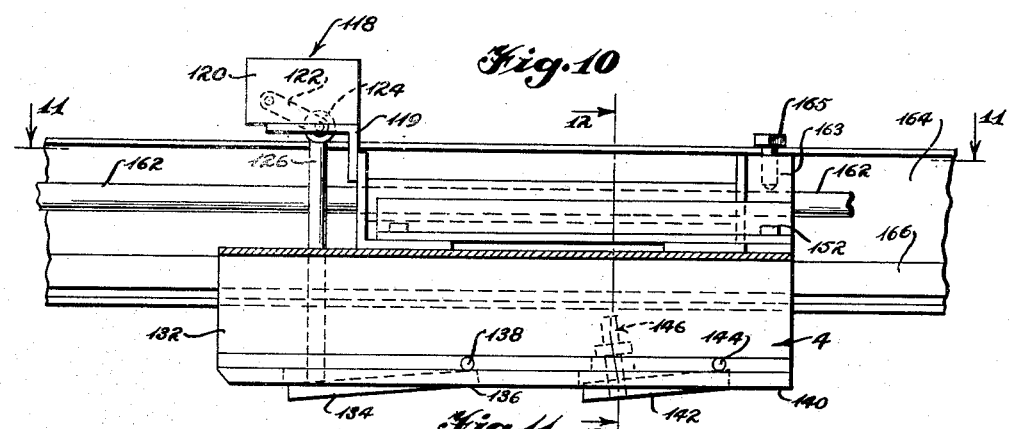
Figure 10 is an enlarged side view, partly in section, of the pusher assembly of the device shown in Figure 1.
Figure 11:
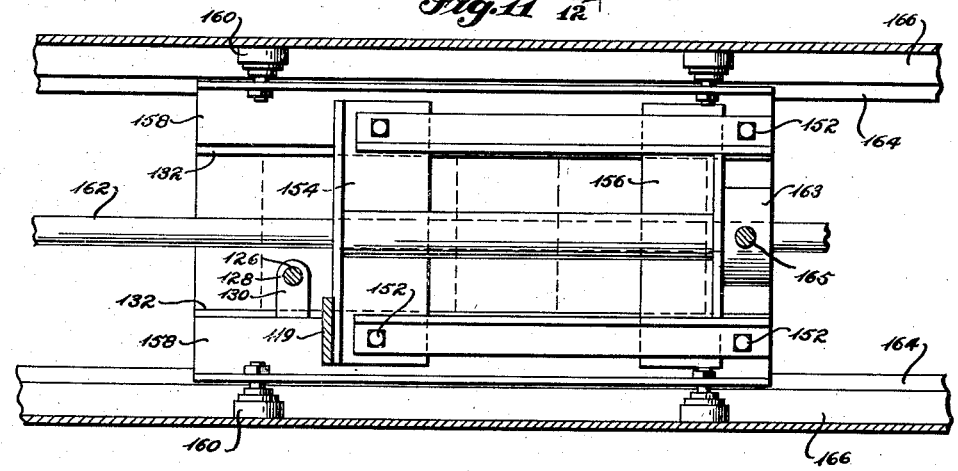
Figure 11 is a top sectional view taken along the line 11—11 of Figure 10.
Figure 12:
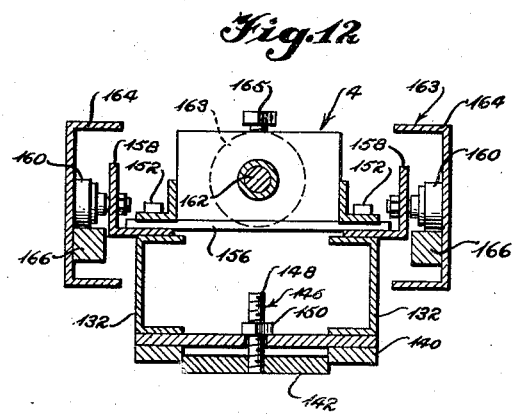
Figure 12 is a front end sectional view taken along the line 12—12 of Figure 10.

Operation of the motor 56 is controlled by means of control unit 118 which is carried by angle piece 119 upon the pusher assembly 4. The control unit 118 (refer to Figures 10, 11 and 12) consists of an electric switch 120 having an actuating lever 122 provided at its lower end with a roller 124. The switch 118 is of a normally closed type so that, unless lever 122 is moved to actuate the switch, current flows through the electric line connecting the switch to the motor 56.

The roller 124 rests upon a rod 126 which is slidably carried in holes 128 provided in the lugs 130 attached to the side member 132 of the pusher assembly 4. The lower end of the rod 126 rests upon a bar 134 which is hinged at the end 136 by means of hinge 138 to bottom plate member 140 fastened to the side members 132 of the pusher 4. The bottom plate 140 also carries one or more other bars 142 hinged at one end by hinges 144 to the plate. These fingers 142 have means 146 for limiting the distance of drop which consists of a bolt 148 fastened to the bar 142 by an adjustment nut 150 which bears upon the top surface of the plate member 140.

The side members 132 of the pusher 4 are fastened, such as by bolts 152, to a carriage which consists of cross pieces 154 and 156 and longitudinal frame members 158 which carry the rollers 160. Holes are driven through each of the vertically extending portions of cross pieces 154 and 156 in order to admit a connecting bar 162. At the rear cross piece 156, there is fastened a bushing 163 which carries a locking bolt 165, which permits the pusher 4 to be adjusted along the length of the bar 162 so that various sizes of the plywood panels may be accommodated by the machine.

The pusher unit 4 is slidably carried in a horizontal runway 163 which is positioned lengthwise above the elevator 2 at the middle of the machine. The runway 163 consists of two channel members 164 which have fastened thereto roller bars 166 which extend a sufficient distance along the channel members to permit the pusher 4 to reciprocate for pushing panels of various sizes.

The horizontal runway 163 also carries a portion of the cam unit 6 which is used to drive the pusher 4. This cam unit comprises a horizontal carriage 168 (refer to Figures 7, 8 and 9) consisting of a base plate 170, vertical side members 172 to which are fastened rollers 174 and vertical plate members 176 and 177. These vertical plates 176 and 177 are positioned along the plane of reciprocation of the carriage 168 and have a gap 178 between them. A clevis 180 is hinged by a bolt 182 to the rear end of plate 176 and a rod 162 threads into the clevis 180, thus connecting the pusher unit 4 to the cam unit 6.

The channel member 164 carries a pair of runner bars 184 upon which the rollers 174 operate.

The remaining portion of the pusher driving eccentric 6 comprises a horizontally mounted wheel 186. This wheel is mounted upon a shaft 188 which is carried in a bearing 190 mounted upon one of the channel members 164 so that the shaft 188 is normal to the plane of reciprocation of the carriage 168. The side of the wheel opposite to the supporting shaft 188 has a lug 192 extending therefrom which carries a roller 194. The lug and roller are sized so that they fit snugly in the gap 178 between the plates 176 and 177.

As can be seen, forced rotation of the shaft 188 causes the wheel 186 to rotate which, in turn, causes the carriage 168 to oscillate within the runway 163 by movement of the lug 192 and roller 194 within the gap 178.

The other end of the shaft 188 (see Figures 1 and 2) is supported in a bearing 196 which is mounted upon the top frame member 74. A pair of sprockets 198 and 200 are fastened to the shaft 188 adjacent to the bearing 196. A chain 202 connects the sprockets 198 and 200 to corresponding sprockets 204 and 206 which are fastened to the shaft 208.

The shaft 208 is carried in bearing 210 mounted upon the channel member 164 and bearing 212 mounted upon the frame member 74. The shaft 208 is driven through a clutch unit 214 which is operated by the sprocket 216 connected through chain 218 to the sprocket 220 fastened upon the shaft 222 of the motor 104. The clutch 214 is provided with lever 224 to control the operation of the clutch. The lever 224 also serves to operate a switch 225 which cooperates with control unit 118 (refer to Figure 19) in controlling the operation of motor 56. Thus, when lever 224 is moved to close clutch 214, it also closes switch 225 causing current to flow from the main control switch 278 to switch 120, which is normally closed, and on to motor 56. When the top sheet on the elevator contacts control 118, switch 120 is opened and current to motor 56 is stopped, although switch 225 is still closed. Thus, the switch 225 prevents the elevator from moving whenever the clutch 214 is disengaged.

The shaft 208 also serves to drive the pinch roll assembly 8. The outer end of the shaft 208 (see Figure 1) has fastened thereto a sprocket 226 which is connected by means of chain 228 to the sprocket 230 which drives the top roll 232 and sprocket 234 which drives the bottom roll 236. The chain 228 operates through the idler 238 carried upon the support bar 240 and the idler 242 carried upon shaft 244.

The pinch roll assembly 8 (see Figures 3, 4, and 5) consists of a pair of vertical posts 246, each topped by plates 247 which have fastened thereto bearings 248 which carry the shafts 250 upon which the bottom roll 236 rotates. At the top of the supporting plates 247 there are fastened channel members 252 which slidably carry the bearings 254 which support the shafts 256 upon which the top roll 232 rotates. Fastened to the top of the bearing units 254 are threaded rods 258 which pass through the hubs 260 and which screw-thread into the inside threaded hubs 262 and 264. The hub 262 carries a hand wheel 266 upon spokes 268, this hand wheel permitting the hub to be rotated so as to raise and lower the rod 258. The top of the hub 262 is shaped to form a sprocket 270 and a corresponding sprocket 272 is formed upon the upper end of the hub 264. The sprocket 272 is connected to the sprocket 270 by means of chain 274 so that when wheel 266 is rotated to raise or lower the rod 258 in the hub 262, the rod 259 in the hub 264 is raised or lowered a corresponding distance. Thus, the gap 276 between the rolls 232 and 236 may be adjusted to accommodate sheets or panels of various thickness.

A master control switch 278 is mounted upon the supporting post 246. Hence, all of the manual controls of the machine are positioned for easy access by the machine operator at one point. Thus, the roll adjusting wheel 266, the master switch 278 and clutch levers 86 and 224 may all readily be reached by an operator standing immediately beside the wheel 266.

The pinch roll assembly 8 is braced by being fastened at the rear portion 280 of the roll support plate 247 to the machine frame 26 and also by means of cross piece 282 which is fastened at the top end of each of the support post plates 247.

The sheet stop assembly 12, referred to hereinbefore, with regard to Figures 13, 14 and 15, consists of a triangular plate 284 which is cut out at the top rear portion to form a semi-circular opening 286 which fits around the bottom roll 234. The very top 288 of this plate 284 is sloped so that it serves as a guide to channel the front end of sheets or panels between the pinch rollers. Another sloping guide member 290 is provided at the other side of the bottom roll 234. This sloping guide 290 which is fastened to the plate 284 by means of bolts 292 and flange 294 serves to guide the rear end of sheets or panels as they emerge from between the pinch rolls. Further, a guide roller 296 may be provided beyond the guide 290 in order to further help to guide and convey sheets transferred from the machine.

When it is desired to use the machine to transfer extra large panels or sheets, an arrangement such as shown in Figure 18 is employed. Thus, the rear frame member 298 has a hole 300 drilled therethrough to permit the rear end of rod 162 to extend beyond the frame. A pusher assembly 302 comprising rear vertical plate 304, side plates 306 and base plates 308 is slid upon the rod 162 through a hole in the rear plate 304 and two retaining elements 310 hold the pusher 302 fixed upon the rod. A plurality of pusher bars 312 made of steel are fastened upon the base plate 308. Because of the play created by the flexibility in the long length of the rod 162, it is unnecessary to use the movable pushing fingers of the type 142 which are incorporated with the pusher element 4 in conjunction with the transfer of shorter panels or sheets on the pusher 302. When operating with large panels, using the pusher 302, the operation of the elevator 2 is, however, still controlled through the control element 118 carried upon the pusher 4.

In some cases, it is desirable to load a stack of panels or sheets onto the elevator 2 by means of a truck or the like instead of using the roller conveyor 14. In order to prevent damage to the elevator or machine frame when this is done, the rear end of the elevator may have attached thereto an extension 314 to which a rod 316 is hinged by pin 318. This rod passes through the floor supporting the machine and is of sufficient length that it will remain supported at its lower end, regardless of the horizontal level assumed by the elevator. As can be seen, the bar 318 prevents loads or stacks of panels from being run under the elevator.

The present invention provides a new method for transferring sheets of considerable weight and size from one stack in a given number to another stack at an assembly station where the smaller stack is required for such purposes as wrapping for shipment or the like. The invention further provides new machines for carrying out such methods without scarring or otherwise defacing the transferred panels and without requiring use of manual labor except to start or stop the machine at the beginning or end of an operation.

I claim:

1. Apparatus for feeding plywood panels from a stack, comprising an elevator for supporting the stack, a horizontal trackway supported in fixed position above the stack, a carriage mounted for reciprocation on the trackway adjacent the rear end of the stack, means for reciprocating the carriage, a pusher carried by the carriage to engage the rear edge of the uppermost panel in the stack upon rearward movement of the carriage and to advance said panel upon forward movement of the carriage, a panel feeler on the carriage, ahead of the pusher, power means for raising the elevator and control means actuated by the position of the feeler for controlling the operations of said power means to raise the elevator.

2. Apparatus for feeding plywood panels from a stack, comprising a vertically movable stack supporting elevator, an electric motor for raising the elevator, a horizontal trackway above the elevator and the stack, a carriage reciprocable on the trackway, a second electric motor for reciprocating the carriage, a pusher pivoted to the carriage in position to engage the rear edge of the uppermost panel upon rearward movement of the carriage and to advance said panel upon forward movement of the carriage, a vertically movable feeler carried by the carriage ahead of the pusher to contact the uppermost sheet in the stack, an electric switch carried by the carriage arranged to be closed when the feeler drops to a predetermined position, and a circuit controlled by said switch for energizing the first-mentioned motor to raise the elevator.

3. Apparatus for feeding plywood panels from a stack, comprising a vertically movable, stack supporting elevator, an intermittently operated electric motor for raising the elevator step by step, a horizontal trackway extending above the elevator and above the position of a stack thereon, a carriage mounted for reciprocation on the trackway, a pivoted pusher carried by the carriage positioned to engage the rear edge of the uppermost panel upon rearward movement of the carriage and to advance said panel upon forward movement thereof, a pair of pinch rolls positioned to receive the advanced panels, a second electric motor for reciprocating the carriage and for rotating the rolls, a feeler carried by the carriage ahead of the pusher, means actuated by the position of the feeler for controlling the first-mentioned motor, and a switch for cutting off both of said motors in unison.

4. Apparatus for feeding plywood panels from a stack, comprising a vertically movable stack supporting elevator, a horizontal trackway supported above the elevator and above the stack, a horizontally reciprocable rod parallel to the trackway, a carriage mounted on the trackway, means for connecting the carriage to the rod at a plurality of different positions of longitudinal adjustment, for operation with panels of different lengths, a pusher finger pivoted to the carriage to engage the rear edge of the uppermost panel in the stack when the carriage is moved rearwardly and to advance said panel when the carriage is moved forwardly, a feeler carried by the carriage ahead of the pusher finger to engage the uppermost sheet in the stack, and an electric motor controlled by the feeler for raising the elevator.

5. Apparatus in accordance with claim 4 further comprising a second carriage mounted on said trackway, ahead of the first carriage and connected to the forward end of said rod, a crank for reciprocating the second carriage and a second motor for driving said crank.

6. Apparatus for feeding plywood panels from a stack, comprising a stack supporting elevator, a longitudinally extending horizontal trackway disposed above the center line of the stack, a carriage mounted on the trackway, a pusher pivoted to the carriage in position to engage the rear edge of the uppermost panel in the stack, a second carriage mounted on the trackway for reciprocating movement along a fixed, limited path, a rod secured at one end to the second carriage and adjustably connected to the first to vary the position of the latter for operation with stacks of panels of different lengths, a pair of pinch rolls at the front of the apparatus in position to receive a panel advanced thereinto by the pusher, a crank for reciprocating the second carriage along said path, an electric motor for driving the crank and the pinch rolls, a feeler carried by the first carriage ahead of the pusher, in position to engage the uppermost panel in the stack, an independent electric motor for raising the elevator, means controlled by the feeler for energizing the last-mentioned motor, a clutch between the first-mentioned motor and the pinch rolls and second carriage for disconnecting them from the motor and an electric switch for de-energizing both motors when the clutch is thrown out.

RAY C. DEMLER.

REFERENCES CITED

The following references are of record in the file of this patent:

UNITED STATES PATENTS

| Number | Name | Date |
| --- | --- | --- |
| 523,384 | Tirrell et al. | July 24, 1894 |
| 1,174,739 | Langston | Mar. 7, 1916 |
| 1,242,356 | Langston | Oct. 9, 1917 |
| 1,691,919 | Carroll | Nov. 20, 1928 |
| 1,784,335 | Christophel | Dec. 9, 1930 |
| 2,396,240 | Belluche | Mar. 12, 1946 |
| 2,467,493 | Pabich | Apr. 19, 1949 |